(12) United States Patent
Lee

(10) Patent No.: US 8,119,218 B2
(45) Date of Patent: Feb. 21, 2012

(54) OPTICAL RECORDING MEDIUM

(75) Inventor: Kwanglyul Lee, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 299 days.

(21) Appl. No.: 12/482,661

(22) Filed: Jun. 11, 2009

(65) Prior Publication Data

US 2010/0112268 A1 May 6, 2010

(30) Foreign Application Priority Data

Nov. 6, 2008 (KR) .......................... 10-2008-0109922

(51) Int. Cl.
B32B 3/02 (2006.01)
(52) U.S. Cl. .................. 428/64.1; 428/64.4; 430/270.12
(58) Field of Classification Search .......................... None
See application file for complete search history.

(56) References Cited

U.S. PATENT DOCUMENTS

2004/0038080 A1* 2/2004 Inoue et al. ............. 428/694 SC
2005/0112319 A1* 5/2005 Itoh et al. ...................... 428/64.4
2009/0047462 A1* 2/2009 Lin et al. ...................... 428/64.7

FOREIGN PATENT DOCUMENTS

JP 11-167743 A 6/1999
JP 2004-005947 A 1/2004

OTHER PUBLICATIONS

Korean Office Action dated Aug. 31, 2009.
U.S. Office Action issued in U.S. Appl. No. 12/482,704 dated Jun. 8, 2011.

* cited by examiner

Primary Examiner — Elizabeth Mulvaney
(74) Attorney, Agent, or Firm — KED & Associates, LLP

(57) ABSTRACT

An optical recording medium is provided. The optical recording medium includes a first recording layer and a second recording layer. The first recording layer includes a compound in the form of $M_{(1-x)}O_x$, where M is one of Si, Zn or Sn, and X is approximately 0.001 to 0.1.

14 Claims, 3 Drawing Sheets

OPTICAL RECORDING MEDIUM

This application claims the benefit of Korean Patent Application No. 10-2008-0109922 filed on Nov. 6, 2008, the entire contents of which is incorporated by reference.

BACKGROUND

1. Field

Embodiments of the invention relate to an optical recording medium, and more particularly, to a composition and a structure of a recording layer of a recordable type optical recording medium for information storage.

2. Description of the Related Art

With the advent of multimedia age comprehensively dealing with a video signal including a moving picture and a stop picture, an audio signal, and computer data information, package media including various kinds of discs such as CD and DVD have widely spread. Recently, there have been active efforts to apply an optical disc to a recording medium of a mobile phone, a digital camera, broadcasting, and a movie.

It is expected to show more remarkably such a tendency to apply the optical disc to the recording medium in the next generation media. To keep pace with such a tendency, a data transfer rate of a blu-ray disc (BD) used as the next generation media becomes greater than a current data transfer rate (i.e., 30 Mbps to 35 Mbps), a laser wavelength of the BD becomes shorter so as to achieve a high-density and large-capacity optical disc, and the size of a recording mark of the BD becomes shorter as a numerical aperture increases.

The optical recording medium may be classified into a read-only memory (ROM) disc, a recordable disc capable of recording information only once, and a rewritable disc capable of repeatedly writing, reading, and deleting information. In the ROM disc, servo, location information, or fine grooves in the form of pit are formed in a circumference direction of the ROM disc, and a reflective layer exists in the ROM disc. The recordable disc may be applied for data backup or storage of broadcasting, movie, etc.

Materials of a recording layer of the recordable disc may use an organic material such as dye or an inorganic material. The recordable disc may record through the following mechanisms: (1) a pit is generated by burning the recording materials of the recording layer, (2) as the recording materials are decomposed, a volume of the recording materials expands and results in the generation of a pit, (3) the recording layer is melted and then is solidified to thereby form a new phase, or (4) a new material (for example, silicide, germanide, and antimonide) is formed by a reaction on a contact surface between the recording materials.

Recently, in the BD, there have been continued efforts to search a recording material capable of achieving a jitter characteristic under the conditions of a wavelength of 405 nm, a recording velocity of 4.917 m/s to 29.5 m/s, and a recording power of 3 mW to 14 mW.

SUMMARY

Embodiments of the invention provide an optical recording medium having excellent recording characteristics.

In one aspect, there is an optical recording medium comprising a first recording layer and a second recording layer, wherein the first recording layer includes a compound in the form of $M_{(1-X)}O_X$, where M is one of Si, Zn or Sn, and X is approximately 0.001 to 0.1.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 1:
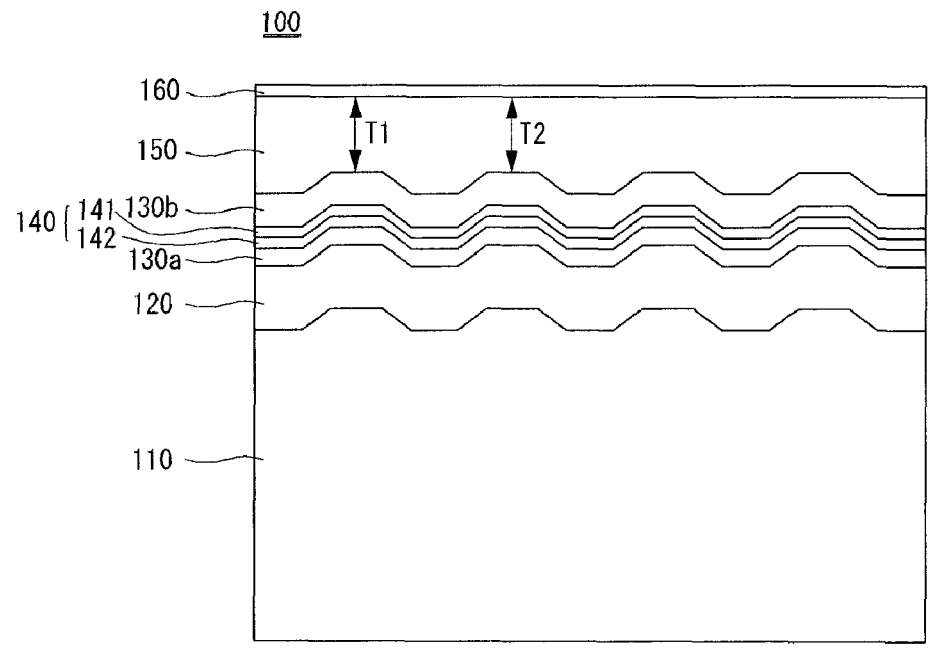
FIG. 1 is a cross-sectional view illustrating an exemplary structure of an optical recording medium according to an embodiment of the invention.

FIG. 1 is a cross-sectional view illustrating an exemplary structure of an optical recording medium according to an embodiment of the invention.

As shown in FIG. 1, an optical recording medium 100 according to an embodiment of the invention includes a substrate 110, a reflective layer 120 on the substrate 110, a first dielectric layer 130a on the reflective layer 120, an information recording layer 140, including a first recording layer 141 and a second recording layer 142, on the first dielectric layer 130a, a second dielectric layer 130b on the information recording layer 140, a cover layer 150 on the second dielectric layer 130b, and a coating layer 160 on the cover layer 150.

The optical recording medium 100 according to the embodiment of the invention may be a blu-ray disc recordable (BD-R). The BD-R may be a recordable type optical recording medium capable of recording information only once. The BD-R may record information through the following mechanisms: (1) a pit is generated by burning recording materials of a recording layer of the BD-R, (2) as the recording material are decomposed, a volume of the recording materials expands and results in the generation of a pit, (3) the recording layer is melted and then is solidified to thereby form a new phase, or (4) a new material is formed by a reaction on a contact surface between the recording materials.

The above mechanisms may be combined, and a recording mark of the BD-R may be produced by the combination of the mechanisms. If a laser beam is irradiated to the BD-R, a phase change occurs in each of first and second materials of the recording layer, and the first and second materials in a phase change state are mixed. Hence, a material having optical characteristics different from optical characteristics of a material around the recording layer may be produced. In this case, data may be recorded by changes in the optical characteristics of the recording material, and the recorded data may be read by changes in a reflectance resulting from changes in the optical characteristics before and after data recording.

The optical recording medium 100 according to the embodiment of the invention may be a BD-rewritable (BD-RE) capable of repeatedly recording information. If a laser beam is irradiated to the BD-RE, information may be recorded by changing a phase of the BD-RE from a crystalline state to an amorphous state. The information may be deleted by changing the phase of the BD-RE from the amorphous state to the crystalline state. Accordingly, the BD-RE can repeatedly write and delete information through the above mechanisms.

In the embodiment, the substrate 110 supports a physical shape of the optical recording medium 100. The substrate 110 may be generally formed of ceramic, glass, resin, and the like. It may be preferable that the substrate 110 is formed of polycarbonate (PC). Other materials may be used for the substrate 110.

The substrate 110 may have a thickness of approximately 1.1 mm so as to have a recording layer on one surface of the substrate 110. The surface of the substrate 110 may include projections and grooves each having a uniform pattern.

The reflective layer 120 may control multi-reflection conditions inside the information recording layer 140 to thereby control a balance between absorption and reflection of the laser beam and a balance between absorption, transfer, and discharge of heat. The reflective layer 120 may be formed of gold (Au), aluminum (Al), nickel (Ni), iron (Fe), chrome (Cr), silver (Ag), or an alloy thereof. Other materials may be used. The reflective layer 120 may be formed using a sputtering method or an ion plating method. The reflective layer 120 may have a thickness of approximately 70 nm to 100 nm.

The first dielectric layer 130a may be positioned on the reflective layer 120. The first dielectric layer 130a may be generally formed of a material with a large optical refractive index. Because the multi-reflection conditions are easily controlled by adjusting a thickness of the first dielectric layer 130a, a descried contrast can be obtained.

The first dielectric layer 130a may be formed of a physically and chemically stable material that has a melting point and a softening temperature higher than those of the first and second recording layers 141 and 142 and does not form a solid solution together with a material forming the first and second recording layers 141 and 142. For example, the first dielectric layer 130a may be formed of at least one selected from the group consisting of AlN, GeN, SiN, $Al_2O_3$, ZnS—$SiO_2$, TiO, and $SiO_2$.

Because the first dielectric layer 130a is positioned on the reflective layer 120, plastic can be prevented from being damaged because of a high temperature. The first dielectric layer 130a controls a velocity of heat emitted from the information recording layer 140 to the reflective layer 120 and thus can control a recording power and a shape of the recorded mark. The first dielectric layer 130a may be formed using a sputtering method or an ion plating method. The first dielectric layer 130a may have a thickness of approximately 15 nm to 80 nm.

The information recording layer 140 including the first and second recording layers 141 and 142 may be positioned on the first dielectric layer 130a. In FIG. 1, the first recording layer 141 is positioned on the second recording layer 142. However, locations of the first and second recording layers 141 and 142 may be reversed to each other. Further, in FIG. 1, the first and second recording layers 141 and 142 are successively positioned on the substrate 110. Other location relationships may be used.

The first and second recording layers 141 and 142 may be formed of a material that absorbs light, coverts energy of the absorbed light into heat energy to generate heat, and achieves an optical contrast through a reaction. The first recording layer 141 may include a compound in the form of $M_{(1-x)}O_x$, where M is one of Si, Zn or Sn, and X is approximately 0.001 to 0.1. Preferably, X is approximately 0.05 to 0.1. The second recording layer 142 may include a compound in the form of $Cu_yN_{(1-y)}$, where N is one of Sn, Zn, Al, Mg, Ge, Sb or Te, and Y is approximately 0.01 to 0.5. Preferably, Y is equal to or greater than 0.5.

A thickness of each of the first and second recording layers 141 and 142 may be approximately 3 nm to 25 nm. Preferably, a thickness ratio of the first and second recording layers 141 and 142 may be approximately 1:0.5 to 1:2. When the thickness ratio of the first and second recording layers 141 and 142 is equal to or greater than 1:0.5, a DC recording power may be reduced and the contrast may increase. When the thickness ratio of the first and second recording layers 141 and 142 is equal to or less than 1:2, an increase in the DC recording power and a reduction in the contrast may be prevented.

If a laser beam is irradiated to the first and second recording layers 141 and 142, formation materials of the first and second recording layers 141 and 142 react with each other to form a new material. The recording mark is produced through the above formation mechanism of the new material.

Figure 2:
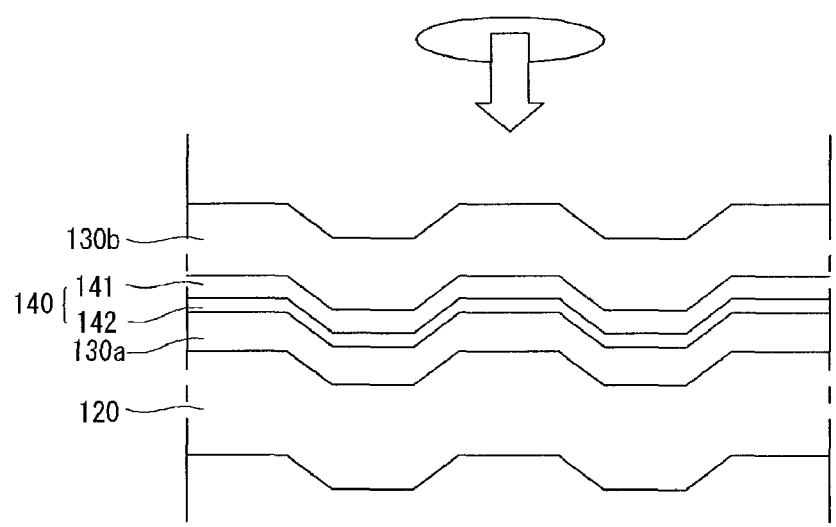
FIGS. 2 and 3 illustrate a recording mark of the optical recording medium when a laser beam is irradiated to the optical recording medium.
Figure 3:
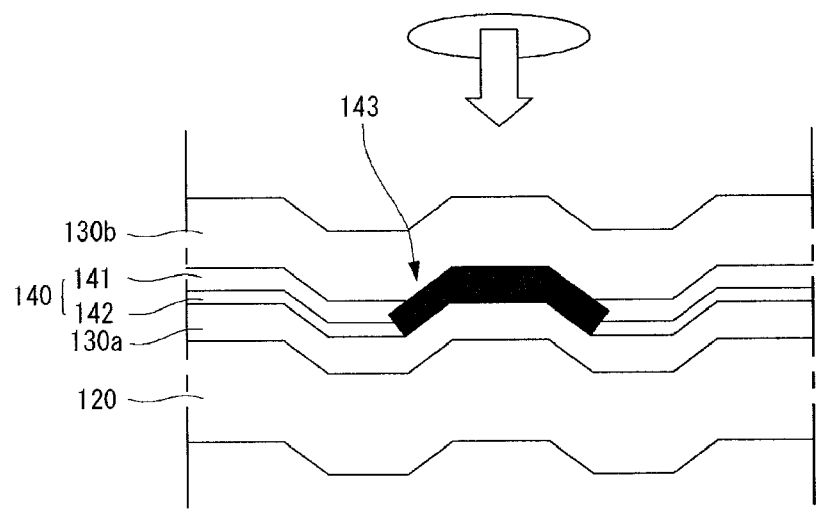

FIGS. 2 and 3 illustrate a recording mark of the optical recording medium 100 when a laser beam is irradiated to the optical recording medium 100.

Grooves and lands are formed on the surface of the information recording layer 140 and serves as a guide of the laser beam irradiated to the optical recording medium 100.

If the laser beam is irradiated to a land area of the information recording layer 140 as shown in FIG. 2, the first and second recording layers 141 and 142 are melted and react with each other to form a recording mark 143 as shown in FIG. 3. Namely, there is a large difference between reflectances of the recording mark 143 and an optically non-recording portion. Hence, a land recording may be performed.

A groove recording means that the recording mark 143 is formed along a concave path as shown in FIG. 3 to perform the groove recording.

As above, in the optical recording medium 100 according to the embodiment of the invention, both the land recording and the groove recording can be performed.

The laser beam irradiated to the information recording layer 140 may use a laser beam having a wavelength of 405 nm and a numerical aperture of 0.8 to 1.0.

Referring again to FIG. 1, the cover layer 150 on the information recording layer 140 protects data recorded on the information recording layer 140 and has a sufficient light transmittance on a light wavelength band for reading data.

The cover layer 150 may be formed of UV resin. Examples of the UV resin include polycarbonates (PC), polymethylmethacrylate (PMMA), and polystyrene (PS). Other materials may be used.

The cover layer 150 may be formed by attaching a transparent plastic sheet to the information recording layer 140 using a transparent adhesive (for example, UV curing resin) or a pressure sensitive adhesive (PSA). Otherwise, the cover layer 150 may be formed using a transparent resin through a spin coating method. A thickness of the cover layer 150 may be approximately 95 μm to 100 μm.

It may be preferable that a thickness uniformity of the cover layer 150 is within approximately 3%. Because a track pitch of the BD is narrow and a focus size of a laser is small, data recorded on the BD can be accurately recognized when the thickness of the cover layer 150 on the information recording layer 140 is kept constant.

More specifically, when a thickness of the cover layer 150 in a predetermined portion of the cover layer 150 is called a first thickness T1 and a thickness of the cover layer 150 in another portion of the cover layer 150 is called a second thickness T2, the first and second thicknesses T1 and T2 may satisfy the following equation: $0.97 \leq T1/T2 \leq 1.03$. It can be seen from the above equation that the thickness uniformity of the cover layer 150 is within approximately 3%.

The coating layer 160 may be a hard coating layer and may generate a scratch on the surface of the optical recording medium 100. The coating layer 160 may be formed of the same material as the cover layer 150, for example, UV resin. Examples of the UV resin include polycarbonates (PC), polymethylmethacrylate (PMMA), and polystyrene (PS). Other materials may be used.

The coating layer 160 may be formed using a spin coating method. A thickness of the coating layer 160 may be approximately 3 μm to 5 μm.

For example, the cover layer 150 of 95 μm-thickness and the coating layer 160 of 5 μm-thickness may be formed. More specifically, a thickness ratio of the cover layer 150 and the coating layer 160 may be approximately 95:3 to 100:5. When the thickness ratio is equal to or greater than 95:3, a damage of the surface of the optical recording medium 100 resulting from the very thin coating layer 160 may be prevented. When the thickness ratio is equal to or less than 100:5, an increase in a thickness of the optical recording medium 100 resulting from the very thick cover layer 150 may be prevented.

Examples of experiment conducted on the optical recording medium 100 according to the embodiment of the invention are described below. The following experimental examples may be embodied in many different forms in the embodiment of the invention. Other experimental examples may be used.

EXPERIMENTAL EXAMPLE 1

An Ag alloy reflective layer of 70 nm-thickness, a first dielectric layer formed of ZnS—SiO$_2$ of 30 nm-thickness, a second recording layer formed of CuAl of 6 nm-thickness, a first recording layer formed of Si of 6 nm-thickness, and a second dielectric layer formed of ZnS—SiO$_2$ of 30 nm-thickness were sequentially stacked on a doughnut-shaped polycarbonate substrate having an inside diameter of 15 mm, an outer diameter of 120 mm, a thickness of 1.1 mm, and a track pitch of 0.32 μm (including lands and grooves).

An UV curing resin of 95 μm-thickness was coated on the second dielectric layer using a spin coating method, and then an UV curing process was performed on the UV curing resin to form a cover layer. Subsequently, an UV curing resin of 5 μm-thickness was additionally coated through a spin coating method, and then an UV curing process was performed on the UV curing resin to form a coating layer. Each of the cover layer and the coating layer was a light transmitting layer transmitting a laser beam and has a transmittance equal to or greater than 90%.

EXPERIMENTAL EXAMPLE 2

An optical recoding medium of an experimental example 2 was manufactured under the same conditions as the above experimental example 1, except a first recording layer formed of $Si_{0.999}O_{0.001}$.

EXPERIMENTAL EXAMPLE 3

An optical recoding medium of an experimental example 3 was manufactured under the same conditions as the above experimental example 1, except a first recording layer formed of $Si_{0.95}O_{0.05}$.

EXPERIMENTAL EXAMPLE 4

An optical recoding medium of an experimental example 4 was manufactured under the same conditions as the above experimental example 1, except a first recording layer formed of $Si_{0.90}O_{0.10}$.

EXPERIMENTAL EXAMPLE 5

An optical recoding medium of an experimental example 5 was manufactured under the same conditions as the above experimental example 1, except a first recording layer formed of $Si_{0.85}O_{0.15}$.

EXPERIMENTAL EXAMPLE 6

An optical recoding medium of an experimental example 6 was manufactured under the same conditions as the above experimental example 1, except a first recording layer formed of Zn and a second recording layer formed of CuSn.

EXPERIMENTAL EXAMPLE 7

An optical recoding medium of an experimental example 7 was manufactured under the same conditions as the above experimental example 6, except a first recording layer formed of $Zn_{0.999}O_{0.001}$.

EXPERIMENTAL EXAMPLE 8

An optical recoding medium of an experimental example 8 was manufactured under the same conditions as the above experimental example 6, except a first recording layer formed of $Zn_{0.95}O_{0.05}$.

EXPERIMENTAL EXAMPLE 9

An optical recoding medium of an experimental example 9 was manufactured under the same conditions as the above experimental example 6, except a first recording layer formed of $Zn_{0.90}O_{0.10}$.

EXPERIMENTAL EXAMPLE 10

An optical recoding medium of an experimental example 10 was manufactured under the same conditions as the above experimental example 6, except a first recording layer formed of $Zn_{0.85}O_{0.15}$.

EXPERIMENTAL EXAMPLE 11

An optical recoding medium of an experimental example 11 was manufactured under the same conditions as the above experimental example 1, except a first recording layer formed of Sn and a second recording layer formed of CuZn.

EXPERIMENTAL EXAMPLE 12

An optical recoding medium of an experimental example 12 was manufactured under the same conditions as the above experimental example 11, except a first recording layer formed of $Sn_{0.999}O_{0.001}$.

EXPERIMENTAL EXAMPLE 13

An optical recoding medium of an experimental example 13 was manufactured under the same conditions as the above experimental example 11, except a first recording layer formed of $Sn_{0.95}O_{0.05}$.

EXPERIMENTAL EXAMPLE 14

An optical recoding medium of an experimental example 14 was manufactured under the same conditions as the above experimental example 11, except a first recording layer formed of $Sn_{0.90}O_{0.10}$.

EXPERIMENTAL EXAMPLE 15

An optical recoding medium of an experimental example 15 was manufactured under the same conditions as the above experimental example 11, except a first recording layer formed of $Sn_{0.85}O_{0.15}$.

Figure 4:
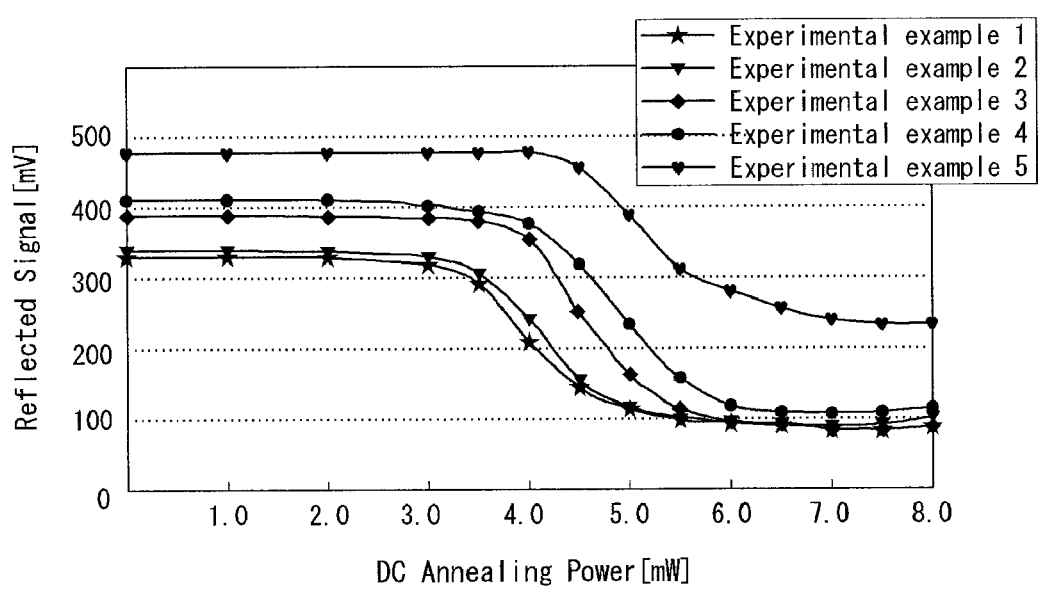
FIG. 4 is a graph illustrating a result obtained by performing a DC annealing process on optical recoding media manufactured according to experimental examples.
Figure 5:
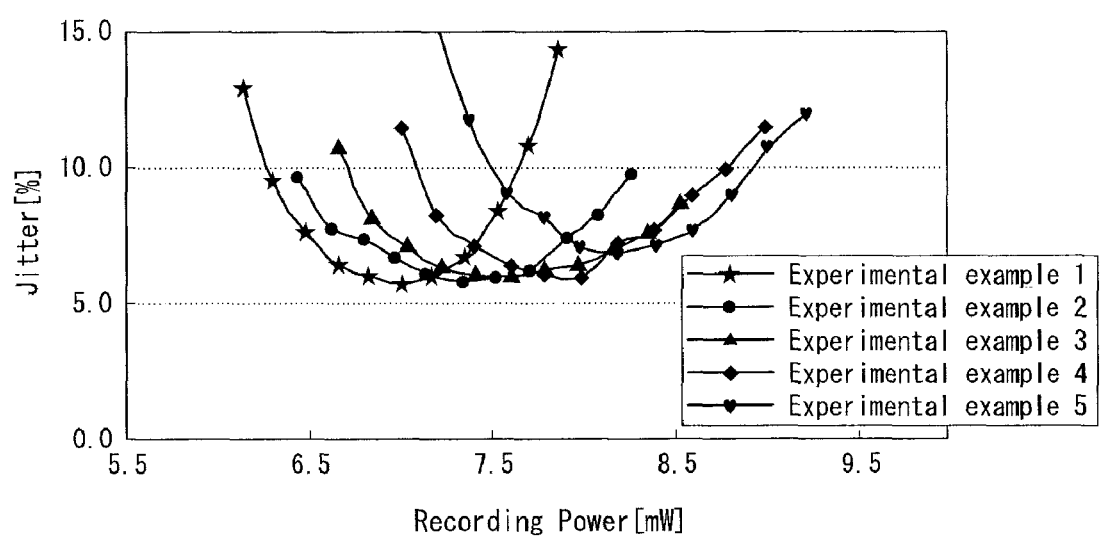
FIG. 5 is a graph measuring a power margin of optical recoding media manufactured according to experimental examples.

The following Table 1 indicates a result measured when a DC annealing process is performed on the optical recoding media manufactured according to the above experimental examples 1 to 15. In particular, FIGS. 4 and 5 illustrate the results of the experimental examples 1 to 5. ODU-1000 produced by Pulstec Industrial Co., Ltd. was used to evaluate the optical recoding media. A composition ratio of the first recoding layer was indicated in terms of atomic percent (at %).

TABLE 1

| | Oxygen content (at %) | DC recording power (m/w) | Power range | Contrast ratio (%) |
|---|---|---|---|---|
| Experimental example 1 | 0 | 3.75 | 1.60 | 70.3 |
| Experimental example 2 | 0.1 | 3.90 | 1.50 | 72.4 |
| Experimental example 3 | 5 | 4.50 | 1.20 | 74.8 |
| Experimental example 4 | 10 | 5.10 | 1.35 | 73.2 |
| Experimental example 5 | 15 | 5.50 | 2.25 | 41.7 |
| Experimental example 6 | 0 | 3.60 | 1.74 | 70.0 |
| Experimental example 7 | 0.1 | 3.65 | 1.70 | 72.0 |
| Experimental example 8 | 5 | 4.20 | 1.45 | 72.0 |
| Experimental example 9 | 10 | 4.60 | 1.67 | 70.0 |
| Experimental example 10 | 15 | 5.00 | 2.50 | 48.0 |
| Experimental example 11 | 0 | 3.50 | 1.70 | 68.0 |
| Experimental example 12 | 0.1 | 3.50 | 1.68 | 71.0 |
| Experimental example 13 | 5 | 4.05 | 1.50 | 73.0 |
| Experimental example 14 | 10 | 4.40 | 1.65 | 69.0 |
| Experimental example 15 | 15 | 4.87 | 2.40 | 50.0 |

Table 1 and FIG. 4 illustrate a result measured when the DC annealing process is performed on the optical recording media each including the first recording layer containing Si as a principal component and the second recording layer formed of CuAl according to the experimental examples 1 to 5. As indicated in Table 1 and FIG. 4, the power range and the contrast ratio in the experimental examples 2 to 4 in which the oxygen content of the first recording layer was 0.1 to 10 at % were more excellent than those in the experimental example 1 not containing oxygen, except the DC recording power. The DC recording power, the power range, and the contrast ratio in the experimental example 5 in which the oxygen content of the first recording layer was 15 at % were worse than those in the experimental examples 2 to 4.

The power range and the contrast ratio in the experimental examples 3 and 4 in which the oxygen content of the first recording layer was 5 to 10 at % were more excellent than the other experimental examples.

FIG. 5 illustrates a power margin measured when data is recorded on the optical recording media manufactured according to the experimental examples 1 to 5. As shown in FIG. 5, a power margin in the experimental examples 2 to 4 in which the oxygen content of the first recording layer was 0.1 to 10 at % was more excellent than a power margin in the experimental examples 1 and 5 within the range of ±10% of an optimum recording power. The excellent power margin means that a change of a jitter value is small. The optimum recording power is a recording power at a minimum value of a jitter.

The experimental examples 6 to 10, in which the optical recording media each including the first recording layer containing Zn as a principal component and the second recording layer formed of CuSn were manufactured, showed the result similar to the experimental examples 1 to 5. More specifically, the power range and the contrast ratio in the experimental examples 7 to 9 in which the oxygen content of the first recording layer was 0.1 to 10 at % were more excellent than those in the experimental example 6 not containing oxygen, except the DC recording power. The DC recording power, the power range, and the contrast ratio in the experimental example 10 in which the oxygen content of the first recording layer was 15 at % were worse than those in the experimental examples 7 to 9.

The experimental examples 11 to 15, in which the optical recording media each including the first recording layer containing Sn as a principal component and the second recording layer formed of CuZn were manufactured, showed the result similar to the experimental examples 1 to 10. More specifically, the power range and the contrast ratio in the experimental examples 12 to 14 in which the oxygen content of the first recording layer was 0.1 to 10 at % were more excellent than those in the experimental example 11 not containing oxygen, except the DC recording power. The DC recording power, the power range, and the contrast ratio in the experimental example 15 in which the oxygen content of the first recording layer was 15 at % were worse than those in the experimental examples 12 to 14.

It can be seen from the experimental examples 1 to 15 that the power range of the optical recording media when the oxygen content of the first recording layer was 5 to 10 at % was more excellent than the power range in other ranges of the oxygen content.

As described above, in the optical recording medium according to the embodiment of the invention, because the first recording layer contains oxygen, the power range, the contrast ratio, and the power margin of the optical recording medium can be improved. Accordingly, the optical recording medium having the excellent recording characteristics can be provided.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical recording medium, comprising:
    a first recording layer; and
    a second recording layer,
    wherein the first recording layer includes a compound in the foini of $M_{(1-X)}O_X$, where M is one of Si, Zn or Sn, and X is approximately 0.05 to 0.1.

2. The optical recording medium of claim 1, wherein the second recording layer includes a compound in the form of $Cu_YN_{(1-Y)}$, wherein N is one of Sn, Zn, Al, Mg, Ge, Sb or Te, and Y is approximately 0.01 to 0.5.

3. The optical recording medium of claim 1, further comprising at least one dielectric layer adjacent to the first recording layer or the second recording layer.

4. The optical recording medium of claim 3, wherein the dielectric layer is formed of at least one selected from the group consisting of AlN, GeN, SiN, $Al_2O_3$, ZnS—$SiO_2$, TiO, and $SiO_2$.

5. The optical recording medium of claim 1, further comprising a substrate, a reflective layer, a cover layer, and a coating layer.

6. The optical recording medium of claim 5, wherein the reflective layer is positioned on the substrate, the cover layer is positioned on the reflective layer, and the coating layer is positioned on the cover layer.

7. The optical recording medium of claim 5, wherein a thickness ratio of the cover layer and the coating layer is approximately 95:3 to 100:5.

8. The optical recording medium of claim 5, wherein the cover layer is formed of at least one selected from the group consisting of polycarbonates (PC), polymethylmethacrylate (PMMA), and polystyrene (PS).

9. The optical recording medium of claim 5, wherein the coating layer is a hard coating layer.

10. The optical recording medium of claim 5, wherein T1 represents a first thickness of the cover layer, and T2 represents a second thickness of the cover layer,
    wherein the first and second thicknesses T1 and T2 substantially satisfy the following equation: $0.97 \leq T1/T2 \leq 1.03$.

11. The optical recording medium of claim 1, wherein each of the first and second recording layers has a thickness of approximately 3 nm to 25 nm.

12. The optical recording medium of claim 1, wherein a thickness ratio of the first and second recording layers is approximately 1:0.5 to 1:2.

13. The optical recording medium of claim 1, wherein the optical recording medium records information only once.

14. The optical recording medium of claim 5, wherein a thickness uniformity of the cover layer is within approximately 3%.

* * * * *